March 5, 1935.  J. E. FULLER ET AL  1,993,324
AUTOMATIC JOINT TIGHTENER FOR VEHICLES
Filed June 27, 1933
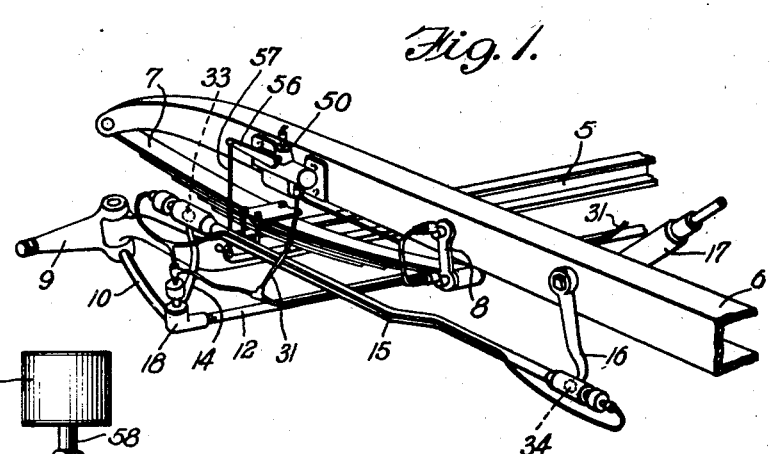
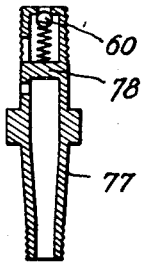
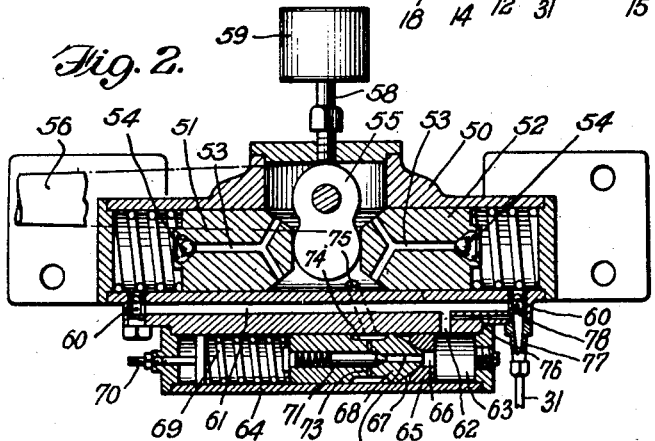
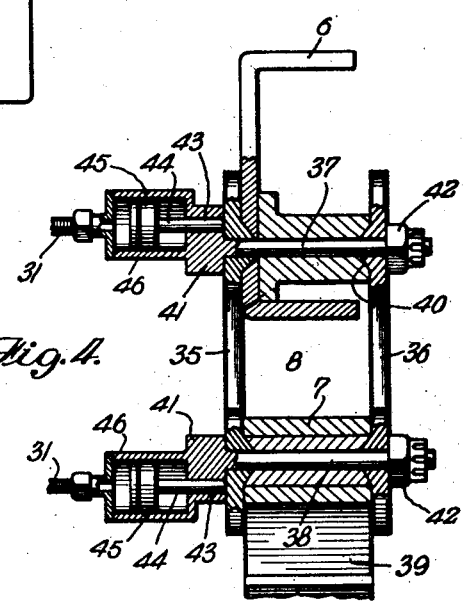
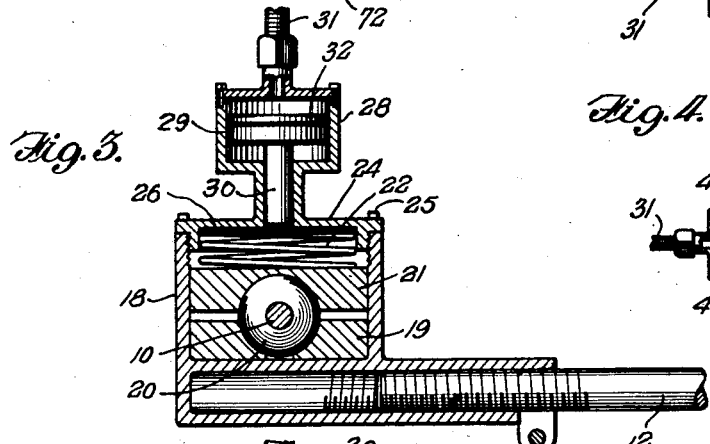
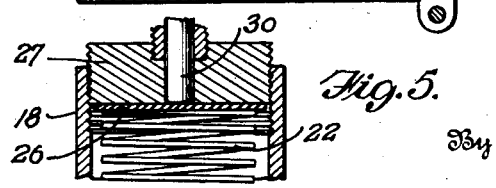
Inventors
John E. Fuller,
Frederick W. Jones.
By Havell + Havell,
Attorney Patented Mar. 5, 1935

1,993,324

UNITED STATES PATENT OFFICE 1,993,324

AUTOMATIC JOINT TIGHTENER FOR VEHICLES

John E. Fuller and Frederick W. Jones, Washington, D. C.

Application June 27, 1933, Serial No. 677,950

9 Claims. (Cl. 280—1)

The object of this invention is to automatically tighten any desired working joint incorporated in a vehicle automatically as the road traveled increases in roughness, and to restore the joint toward normal condition as the road smooths out.

With the above and other objects in view as will be hereinafter pointed out, reference will be had to the accompanying drawing forming a part of this specification and wherein:

Fig. 1 is a perspective view of a portion of the running gear of an automobile with the invention applied to adjust a number of miscellaneous vehicle joints, Fig. 2 is a vertical sectional view of the fluid pressure creating means, applied to a fragment of the body frame of a vehicle, Fig. 3 is a vertical sectional view of the fluid pressure responsive means applied to a steering gear joint, Fig. 4 is a vertical sectional view through the shackle of vehicle spring suspension with pressure responsive means applied thereto.

Fig. 5 is a modification of a portion of Fig. 3.

Fig. 6 is a detail view of one of the removable check valves.

In the drawing, reference numeral 5 designates the front axle of an automobile, 6 the body frame, and 7 one of the body suspending springs conventionally connected to the axle and body frame, and including in the connection a shackle 8. The steering arrangement is conventional and includes stub-axle 9, arm 10, tie rod 12, and arm 14, drag link 15, arm 16, and steering post 17.

The joint between the steering arm 10 and tie rod 12 is substantially conventional and consists of a coupling 18 adjustably secured to the tie rod 12 and containing a separate or integral cup 19 seating the ball 20 on the end of the arm 10. A cupped cap 21 is slidably arranged, piston-like, within the coupling 18 and seats against the ball 20 under pressure of a spring 22 confined by a closure 24 secured to the coupling 18 by screws 25. A piston disk 26 is located within the casing 18 between the closure 24 and spring 22 and the pressure exerted upon the cap 21 by the spring may be increased by inserting shims between the spring 22 and disk 26 as is customary in this type of coupling.

Another type of coupling employs a screw plug 27 instead of the cap 24 and adjustment of the spring 22 is obtained by screwing the plug more or less into the coupling 18. This is the type of coupling usually employed at each end of the drag link 15.

A fluid pressure responsive means comprising a cylinder 28, piston 29 and plunger 30 is mounted upon the cap 24 or upon the plug 27, as the case may be, and is connected by flexible and/or non-flexible conduits 31 with the pressure creating means of Fig. 2. A cup-packing 32 is provided on the piston to prevent leakage of the fluid medium.

As previously suggested, the couplings 33—34 at the ends of the drag link 15 are each similar to the structure illustrated in Figs. 3 or 5, being conventional in every respect save the provision of fluid responsive means to adjust the same. The pressure responsive means for these couplings are also connected by tubing 31 with the pressure creating means of Fig. 2.

The spring suspension shackles are conventional and comprise the usual check plates 35—36 pivotally connected by bolt 37 to the body frame 6 and by similar bolt 38 to the vehicle suspension spring 39. Cones 40 are preferably provided to take up wear and looseness though this may be done by merely tightening the cheek plates against the sides of the spring and body frame. The bolts 37, 38 are provided with heads 41, which, together with the castellated nuts 42 complete a conventional shackle structure.

The heads 41 of the shackle bolts are slightly modified to accommodate in bores 43 thereof, plungers 44 of pistons 45 operating in cylinders 46 and constituting fluid responsive means similar to such means previously described for the other couplings.

While only several working joints to be found upon a motor vehicle are mentioned, it will be understood that fluid responsive means such as have been described may be applied to any working joint incorporated within the vehicle.

The fluid pressure creating means, for operating the several fluid responsive means disclosed, consists of a cylinder 50 attached to the body frame 6 or to any other part of the vehicle that partakes of body motion during the travel of the vehicle. The cylinder is double ended and two pistons 51, 52 are employed, one in each end, and each is provided with one or more ports 53 leading from the cylinder base to the compression chamber, check valve 54 being provided to trap the fluid within the compression chamber.

Between the two pistons is an operating crank or cam 55 secured to an arm 56 which is attached by link 57 to the axle as in shock absorber installation practice. Fluid in the form of oil is supplied to the base of the cylinder through pipe 58 from replenishing reservoir 59.

The fluid from the compression chamber of the cylinders, passes through removable check valves 60 to a passage 61 common to both chambers and communicating through ports 62 with by-pass chamber 63 of a relief cylinder 64. A baffle 65 having a port 66 is located within the chamber 64 and is equipped with a valve seat 67 against which a by-pass valve 68 seats. This valve is under the pressure of spring 69 determined by the adjustment of the screw 70.

A spring pressed bleeder valve 71 is arranged within the bore of the by-pass valve 68 to control passage 72 therein. This passage communicates, when the bleeder valve 71 is open, with radial ports 73 leading therefrom to a circumferential groove 74 in the by-pass valve. Normally, the groove 74 communicates with the port 75 leading from the interior of the relief cylinder 64 to the base of the cylinder 50. A passage 76 leads from the port 62 to the pipe line 31, through check valve fitting 77 having a partition 78.

In operation, as the vehicle travels over a road, body motion is imparted thereto, varying in intensity with the roughness of the road. This body motion, due to the arm 56 and link 57, is imparted to the fluid pressure creating means by the crank 55 alternately reciprocating the pistons 51, 52. Fluid, such as oil, contained within the base of cylinder 50 is thereby sucked through the ports 53 and then trapped in the compression chamber by the check valves 54 on the compression stroke. The fluid is forced past the check valves 60 into the passage 61, through port 62 into the relief chamber space 63, filling the same and then entering the passage 76, passing through the pipe line 31 to the various pressure responsive devices moving their pistons 29 and 45 and respective plungers 30 or 44 as the case may be.

In the case of the joint between the arm 10 and tie rod 12, the plunger 30 bears against the disk 26 and moves the same to compress the spring 22 against the cap block 21 causing the same to more tightly bind the joint ball 20. Normally, the spring 22 alone exerts sufficient pressure upon the ball 20 for positive steering of the vehicle when traveling a fairly smooth road, but on rough roads, the joint moves too freely for positive control action. If the spring is set under greater compression to take care of rough roads, then the joint is too tight or resistant to movement for easy movement on smooth roads.

Accordingly, as the road roughens and vehicle body motion thereby increases, the fluid pressure creating means correspondingly responds to pump fluid to move the piston 29 to cause its plunger to automatically compress the spring an amount commensurate with the pressure developed in the fluid line, thereby tightening the joint in keeping with the increased roughness of the road and automatically regulating the positiveness of steering control according to road conditions.

When fluid pressure is devoloped to a certain degree, the by-pass valve 68 opens against its spring 69 until the base of its conical end clears the port 75, at which time the fluid by-passes to the base of the cylinder 50, thereby relieving the pipe line 31 of undesired excess pressure. By-passing of the fluid does not deprive the fluid responsive devices of fluid pressure, but merely relieves undesired excess pressure.

When the vehicle travels a very even road where body motion is negligible, and when body motion entirely ceases due to stoppage of travel of the vehicle, fluid pressure built up in the line is relieved or released, independent of the by-pass valve 68, by bleeding through the passage 72, past the valve 71, through ports 73 and 75 back to the base of the cylinder 50.

The structure and apparatus of the drag link adjusting means is substantially the same as in the case of the tie rod joints 18 and require no further description.

With respect to the operation of the shackle adjustment, the nuts 42 are set for tightness to take care of normal running on reasonably smooth roads. When the roughness of the road calls for tightened shackle joints, for easy riding and quietness, the fluid pressure creating means becomes active and fluid pressure, commensurate with body motion of the vehicle as caused by road conditions, is supplied to the cylinders 46, moving pistons 45 and causing their plungers 44 to force the cheek plates against the sides of the body frame 6 and spring 7, thereby tightening the joint and damping spring action. By-passing and bleeding of fluid pressure takes place the same in connection with the spring suspension means as with the steering mechanism.

When a rut is encountered in a road, the body 6 moves downwardly whereby piston 52 creates a pulse of fluid to tighten the joints, but inasmuch as back pressure causes much of the fluid moved on this pulse to bypass the valve 68, it becomes necessary to create a second pulse of fluid to tighten the joints on the rebound, which is a very dangerous period in steering control, and this second pulse of fluid is produced by the other piston 51.

While the pressure creating means is shown applied to respond to relative motion between the axle or lower running gear and the body frame or upper running gear, the same may be actuated by any part of a vehicle which partakes of motion due to movement of the vehicle over a road.

The invention is applicable to any working joint incorporated in a vehicle.

What is claimed is:

1. In a vehicle, the combination with a working joint thereof, of means for tightening the joint, means for operating the said means and being operable by body motion of some part of the vehicle caused by road conditions during vehicle travel, and means for automatically limiting the effect of the second named means upon the first named means upon excessive or prolonged action of the second named means.

2. In a vehicle, the combination with a working joint thereof, of fluid responsive means to tighten the joint, and fluid pressure creating means for operating the said first named means and being operable by body motion of some part of the vehicle caused during and by vehicle travel.

3. In a vehicle, the combination with a working joint thereof, of fluid pressure responsive means to tighten the joint, fluid pressure creating means for operating the first named means and being operable by body motion of some part of the vehicle caused during and by vehicle travel, and fluid pressure responsive means for releasing fluid pressure from the first named means under predetermined conditions.

4. In a vehicle, the combination with a working joint thereof, of fluid pressure responsive means to tighten the joint, fluid pressure creating means for operating the first named means and being operated by body motion of some part of the vehicle caused during and by vehicle travel, an automatic by-pass for the second named means, and means for automatically releasing fluid pressure from the first-named means when the second named means ceases functioning.

5. In a vehicle, the combination of a working joint thereof set to freely operate normally, means to tighten the joint, means operated by some part of the vehicle set into motion by travel of the vehicle over a road to operate the tightening means to tighten the joint upon bound and rebound motion of said vehicle part, and means for limiting the effect of the first named means upon the second.

6. In a vehicle, the combination of a working joint thereof set to freely operate normally, means to tighten the joint, means operated by some part of the vehicle set into motion by travel of the vehicle over a road to operate the tightening means to tighten the joint upon bound and rebound motion of said vehicle part, means for limiting the effect of the first-named means upon the second, and means for relieving the effect of the second named means upon the first when the vehicle ceases travel.

7. In a vehicle, a joint embodying at least two relatively moving parts, fluid responsive means for increasing the resistance of one of said parts to movement, fluid pressure creating means controlled by the movement of one of said parts for operating the first named means, a by-pass for the fluid of the fluid pressure creating means, a fluid pressure responsive valve controlling the by-pass, a passage by-passing the by-pass valve, and a fluid pressure responsive bleeder valve incorporated in the first-named valve.

8. In a vehicle, the combination with a working joint thereof comprising two parts between which a third part works, of means separate from the third part and which is operated by body movement of some part of the vehicle caused by road conditions for automatically moving one of the said first two parts relatively to the other to vary the resistance of the third part to movement.

9. In a vehicle, the combination with a part that bounds and rebounds under changes in road conditions, of a steering joint, and means responsive to movement of said part for tightening the said joint during rebound of the said part when the wheels are turned from straightaway position.

JOHN E. FULLER.
FREDERICK W. JONES.